Aug. 17, 1948.  J. F. O'BRIEN ET AL  2,447,026
CONNECTOR UNIT FOR ELECTRIC CONDUITS
Filed Aug. 16, 1944  2 Sheets-Sheet 1
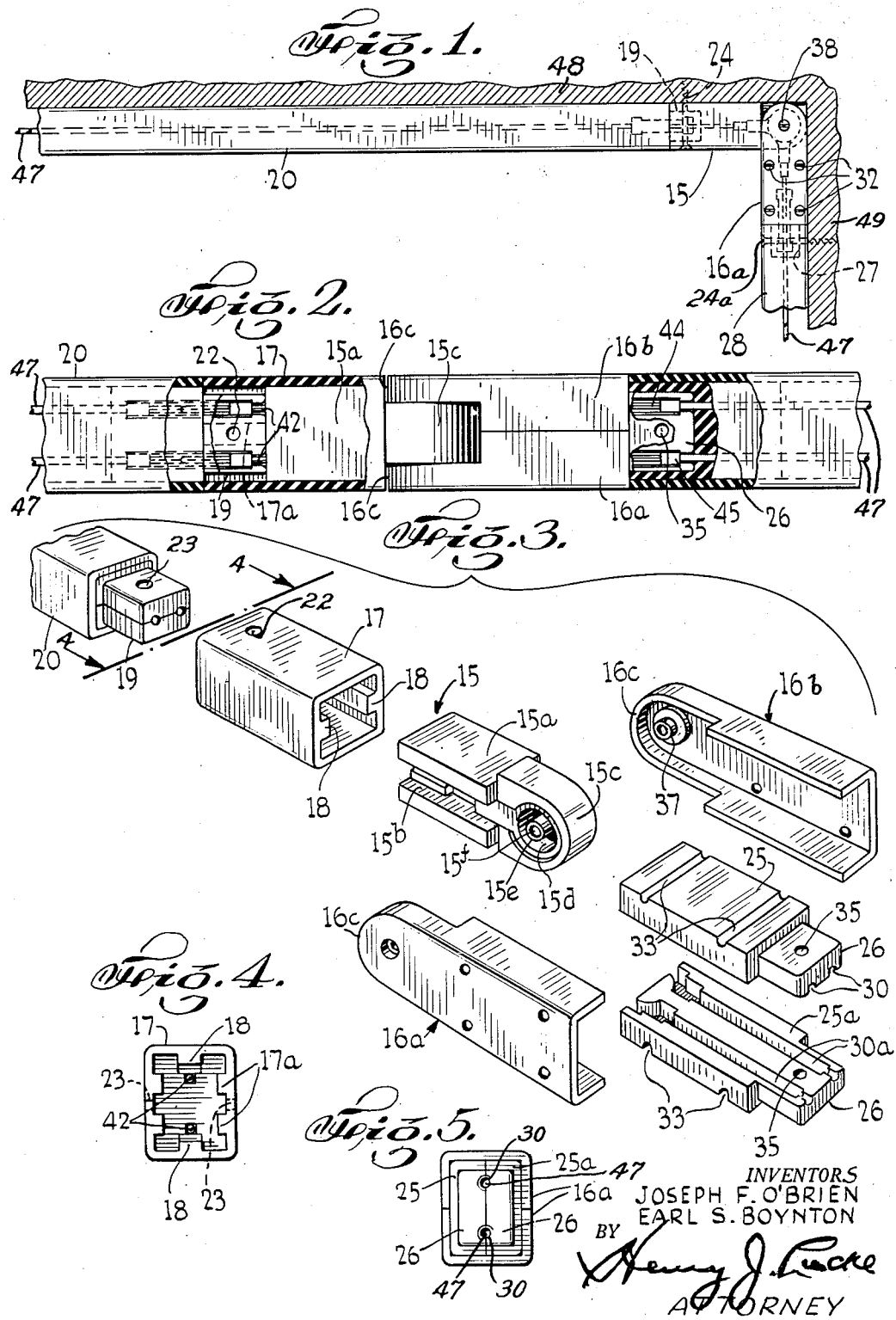
INVENTORS
JOSEPH F. O'BRIEN
EARL S. BOYNTON
BY
Henry J. Lucke
ATTORNEY Aug. 17, 1948. J. F. O'BRIEN ET AL 2,447,026
CONNECTOR UNIT FOR ELECTRIC CONDUITS
Filed Aug. 16, 1944 2 Sheets-Sheet 2
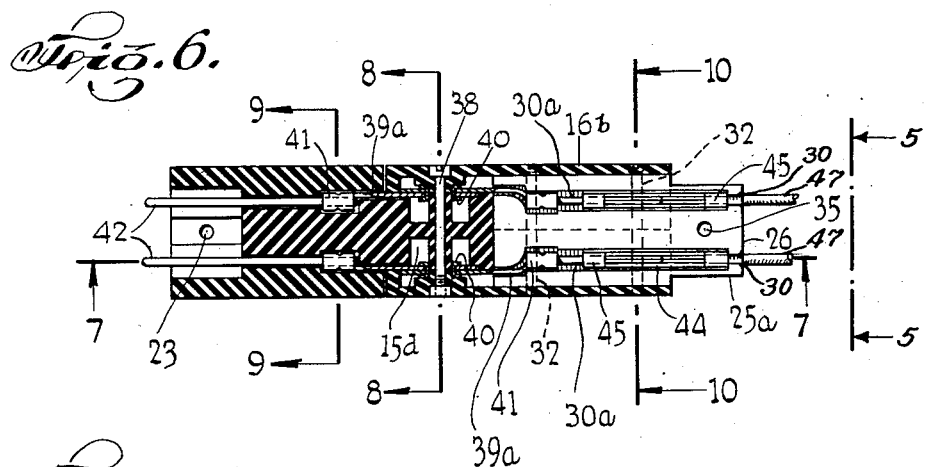
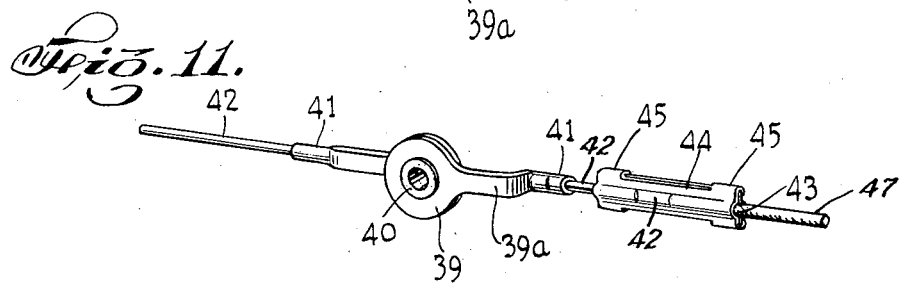
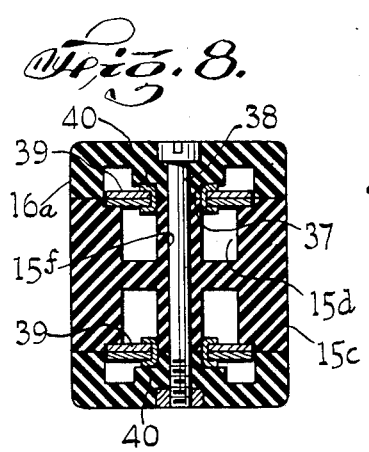
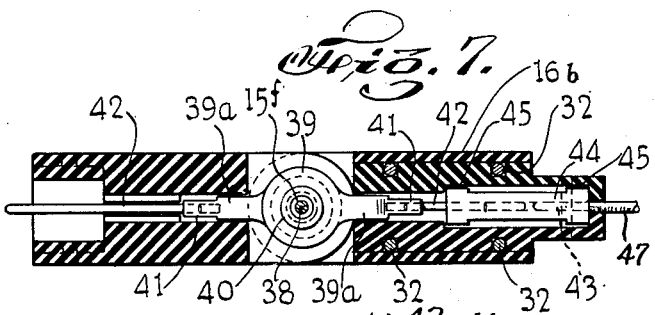
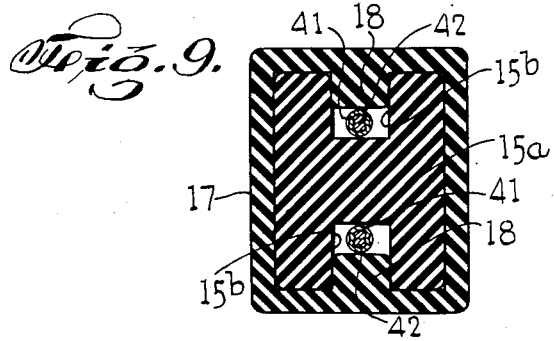
INVENTORS
JOSEPH F. O'BRIEN
EARL S. BOYNTON
BY Henry J. Lucke
ATTORNEY Patented Aug. 17, 1948

2,447,026

UNITED STATES PATENT OFFICE 2,447,026

CONNECTOR UNIT FOR ELECTRIC CONDUITS

Joseph F. O'Brien, Lebanon, and Earl S. Boynton, East Orange, N. J., assignors to John B. Pierce Foundation, New York, N. Y., a corporation of New York Application August 16, 1944, Serial No. 550,866

1 Claim. (Cl. 173—334.1)

Our invention relates to improvements in conduits for enclosing electric conductors, and the same has for its object to provide a simple efficient and reliable means for flexibly connecting the opposing ends of conduits and the electric conductors therein.

Further, said invention has for its object to provide a device including a flexible joint or connection which will permit of the device and the electric conductors enclosed therein to be readily adjusted to any desired angular form in order to adapt the same to interior or exterior walls or surfaces arranged at various angles relative to each other.

Further, said invention has for its object to provide a flexible joint or connection for uniting the adjacent ends of sections or strips of conduits in which both the electric conductors and the conduit joint members have their several hinge portions co-axially disposed to permit of the parts of the device to be movable in unison.

Further, said invention has for its object to provide a device comprising a plurality of pivotally connected, interfitting and inter-engaging parts which may be readily assembled and secured together, without the use of skilled labor, to secure the electric conductors duly in operative relation therein.

Further, said invention has for its object to provide a device including a plurality of parts which are provided in their cooperating faces with recesses or channels in which hinged electric conductor terminals are fitted and held in position by the securing together of the cooperating parts of the joint or connection.

Further, said invention has for its object to provide a flexible joint or connection having male and female ends adapted to readily engage with cooperating parts at the opposite ends of tubular conduit sections or strips to form a continuous conduit of any desired length.

Other objects will, in part, be obvious, and, in part, be pointed out hereinafter.

To the attainment of the aforesaid objects and ends our invention consists in the novel features of construction, and in the combination, connection and arrangement of parts hereinafter more fully described and then pointed out in the claims.

In the accompanying drawings—

Fig. 1 is a diagrammatic plan view of a typical embodiment of the invention applied to adjacent angular walls of a room or other support.

Fig. 2 is an enlarged plan view of a preferred embodiment of the invention, typified in Fig. 1, a part of the hinged portion of the connector and a part of the end portion of the connector being broken away in horizontal section to expose otherwise hidden parts.

Fig. 3 is an exploded perspective view showing the component parts of the connector in substantially relative positions, the electrical conductors being omitted.

Fig. 4 is an end view of the sleeve-like member illustrated in Fig. 3, viewed in the direction indicated by the line 4—4.

Fig. 5 is an end view of Fig. 6, viewed in the direction indicated by the line 5—5.

Fig. 6 is a central horizontal sectional view of the preferred form of connector illustrated in exploded perspective in Fig. 3, and showing the electrical conductors.

Fig. 7 is a detail sectional view on line 7—7 of Fig. 6.

Fig. 8 is a detail sectional view on line 8—8 of Fig. 6.

Fig. 9 is a detail sectional view on line 9—9 of Fig. 6.

Fig. 10 is a detail sectional view on line 10—10 of Fig. 6.

Fig. 11 is a detail perspective view of a pair of hingedly connected conductors of the connector illustrated in Figs. 3, 6 and 7.

In said drawings the device is shown comprising two hinged parts or members 15, 16, formed of suitable insulating material, and of substantially rectangular outline in cross-section.

The member 15 comprises a rectangular block 15a provided at its opposite sides with longitudinal channels 15b, and at one end with a rounded end portion 15c of reduced width. The opposite sides of the rounded end portion 15c are provided with circular recesses 15d, and centrally disposed hubs 15e through which extends the aperture 15f. The member generally designated 16 of the connector comprises two correspondingly shaped, trough-like component parts 16a, 16b, the corresponding ends of said component parts 16a, 16b being rounded in conformity with the opposite faces of the rounded end portion 15c of the member 15, and provided with a circular enlargement 16c dimensioned to be received within the opposite circular recesses 15d of the member 15. Each component part 16a, 16b is provided with a hub 37, each of which has an aperture disposed in alignment with the aperture 15f of the member 15, through which aligned apertures the pivot pin 38 extends, see Figs. 6 and 8. 17 denotes a rectangular tubular cover section or sleeve member engaging the rectangular block 15a, and having longitudinal ribs 18 in its opposite sides which engage with the longitudinal recesses 15b of said block 15a. The outer or free end of the sleeve 17 forms a socket to receive the reduced projecting end 19 of a conduit section 20. The inner opposite sides of the sleeve 17 are provided with short longitudinal ribs 17a, see Figs. 2 and 4, which together with the ribs 18 serve to position the projecting end 19 of one end of the conduit section 20. The sleeve 17 is provided in its opposite sides with apertures 22 which register with an aperture 23 in the reduced end 19, to receive a screw 24, see Fig. 1, whereby said parts are secured together and to a wall or support.

Intermediate the component members 16a, 16b are disposed two rectangular blocks or plates 25, 25a, of corresponding outer dimensions and contour and are each provided with reduced end portions which jointly form a projection 26 to be received within the socket end 27 of a conduit section 28, see Fig. 1.

The mutually contacting faces of said blocks 25, 25a, are provided with registering, longitudinal recesses 30, 30a, respectively, having conforming contours which, when the blocks are assembled, correspond to the shape and form of the hinged electric conductor terminals 39, hereinafter described.

The blocks or plates 25, 25a when duly assembled, correspond in cross-sectional outline with the interior contour of the casing or enclosure formed by the walls 16a, 16a, and are firmly secured in position therein by screws 32, see Fig. 1, which pass through said wall portions 16a, and transverse channels 33 formed in the upper and lower surfaces of said blocks 25, 25a.

The reduced end portion 26, formed by the blocks 25, 25a, is provided with an aperture 35 to receive a screw 24a or other fastening device which also extends through the surrounding end of a conduit section 28 for securing said parts together and to a wall or other support, see Fig. 1.

The electric conductor terminals each consist of two flat, circular heads 39, see Fig. 7, which are rotatably connected by eyelets 40. From the opposite sides of each head 39 extends a short flat arm 39a which terminates in a tubular end 41 in which is secured a short section of wire 42, and to one of said wires 42 is clamped a socket member 43 formed of two conforming relatively narrow, longitudinal plates 44 clamped together by integral ears 45.

The conductor terminals, each have one end disposed between the blocks 25, 25a and within the longitudinal recesses 30a formed intermediate the same, and the other end of each terminal is disposed within the longitudinal channels 15b of the block 15a, and their circular connected heads 39 disposed within the circular recesses 15d in the inner sides of their rounded ends 15c, and traversed by the pivot screw 38 which serves to hold the members 15, 16, operatively connected, and to thereby clamp the flat circular heads 39 of the respective conductor terminals in face to face pressure engagement thus affording good electrical contact of the respective parts of the electrical terminals disposed at the pivotal joint of the device.

The instant invention has application to electrical conduit systems, one form of which is indicated in Fig. 1, exemplified by the conduit section indicated generally 20, provided with electrical conductors 47 of a number corresponding to the electrical conductors 42 of the connector, in this instance two in number. As indicated generally in Fig. 1, and specifically in Figs. 2 and 3, such conduit section 20 is provided with a male end formation 19, and accordingly the conduit section 28, as indicated in Fig. 1, is provided with a female or socket end 27.

Fig. 1 illustrates also one manner of use of the connector forming the subject matter of the instant invention, the conduit section being secured to a wall indicated at 48, as by means of the fastening screw 24 passing through the opposite apertures 23, 23 of the sleeve-like member 17 and also through the aperture 22 of the male end formation of the conduit section 20. In such application of the invention, as illustrated in Fig. 1, the conduit section 28 is secured to the wall 49 and also by means of a fastening screw 24a. Such walls 48, 49 may be the walls of a room or other enclosure, which may be angularly related walls of a room or other enclosure or of any suitable support.

It is to be noted, however, that the pivot screw 38 which serves to hold the joint members or parts 15, 16, pivotally connected does not serve as the means for pivotally or hingedly connecting the cooperating heads 39 of each conductor terminal 31. The said terminal heads 39 are pivotally connected by the eyelets 40, and the pivot screw 38 merely serves to maintain said eyelets 40 axially aligned with the axis of the pivotal connection of said joint members 15, 16.

Due to this novel construction of the device, the hinged portions 15, 16, thereof and the conductor terminals 31 therein may be adjusted simultaneously to different angles and thus readily conformed or adapted to interior or exterior angles of a wall or other support.

Having thus described our said invention, what we claim and desire to secure by Letters Patent is:

An electrical pivotally jointed device comprising in combination a sleeve member provided on its interior faces with longitudinally extending ribs and therewith parallelly extending grooves; a member dimensioned to be received within said sleeve member and provided with longitudinally extending grooves arranged and dimensioned to receive said longitudinally extending ribs of said sleeve member and provide groove space respectively aligned with said grooves of said sleeve member, said second member having a circular end portion exteriorly disposed when said second member is inserted within said sleeve member, said circular end portion having at its opposite lateral faces circular recesses and a perforation extending centrally with respect to said circular recesses; a pair of complementary hollow members provided respectively at one end with circular end portions corresponding to said circular end portion of said second member, and centrally disposed circular bosses dimensioned to be received within said circular recesses respectively; a pair of insert members of corresponding outer dimensions and contour arranged to be respectively received within said pair of complementary hollow members and provided with longitudinally extending grooves; a pair of electrical conductors respectively disposed in said mutually aligned grooves of said sleeve member and said second member; a pair of electrical conductors respectively disposed in said grooves of said insert members, each of said electrical conductors being provided with a flat circular terminal arranged to be respectively received in pairs within said circular recesses of said second member; and pivotal means extending through said central perforation and pivotally interconnecting said pair of hollow members with said second member and affording pressure engagement between said flat circular terminals of said pairs of electrical conductors respectively, whereby pivotal movement at the thus formed joint of said device and good electrical contact between the electrical conductors of the respective pairs of electrical conductors are afforded.

JOSEPH F. O'BRIEN.
EARL S. BOYNTON.

REFERENCES CITED

The following references are of record in the file of this patent:

UNITED STATES PATENTS

| Number | Name | Date |
| --- | --- | --- |
| 277,641 | Weston | May 15, 1883 |
| 958,448 | Vossberg | May 17, 1910 |
| 2,305,100 | O'Brien | Dec. 15, 1942 |
| 2,305,101 | O'Brien | Dec. 15, 1942 |
| 2,336,732 | Howard | Dec. 14, 1943 |